United States Patent
Finn

Patent Number: 5,865,566
Date of Patent: Feb. 2, 1999

[54] CATENARY RISER SUPPORT

[75] Inventor: Lyle David Finn, Sugar Land, Tex.

[73] Assignee: Deep Oil Technology, Incorporated, Houston, Tex.

[21] Appl. No.: 931,180

[22] Filed: Sep. 16, 1997

[51] Int. Cl.⁶ .............................. F16L 27/10; F16L 1/12; E02D 5/54
[52] U.S. Cl. ........................ 405/169; 285/223; 405/224
[58] Field of Search .................... 405/169, 170, 405/224; 285/223, 231

[56] References Cited

U.S. PATENT DOCUMENTS

| | | | |
|---|---|---|---|
| 2,836,436 | 5/1958 | Bianchi | 285/231 |
| 3,142,344 | 7/1964 | Otteman et al. | 285/231 |
| 3,572,272 | 3/1971 | Dixon et al. | 405/224 |
| 4,416,473 | 11/1983 | Lamy et al. | 285/41 |
| 4,418,948 | 12/1983 | Lew et al. | 285/420 |
| 4,540,204 | 9/1985 | Battle et al. | 285/231 |
| 4,854,781 | 8/1989 | Sparks et al. | 405/224 |
| 5,269,629 | 12/1993 | Langner | 405/195.1 |
| 5,314,214 | 5/1994 | Highlen et al. | 285/233 |
| 5,443,330 | 8/1995 | Copple | 405/224.2 |
| 5,738,464 | 4/1998 | Delrieu | 405/202 |

*Primary Examiner*—Thomas B. Will
*Assistant Examiner*—Gary S. Hartmann
*Attorney, Agent, or Firm*—Robert J. Edwards; D. Neil LaHaye

[57] ABSTRACT

A catenary riser support, for a floating offshore structure, that receives the riser and is attached to the floating offshore structure. The catenary riser support is formed from a tube that is rigidly attached to the floating structure and a flex joint in line with the catenary riser. The tube includes a gradual bend that complements the natural catenary curve of the catenary riser. A pipe adaptor attached in line with the flex joint and riser allow the flex joint to be pulled up against the tube. The flex joint allows the catenary riser to move relative to the floating structure.

4 Claims, 2 Drawing Sheets

CATENARY RISER SUPPORT

BACKGROUND OF THE INVENTION

1. Field of the Invention

The invention is generally related to the production of hydrocarbons from subsea formations and more particularly to the support of riser pipe used in such production.

2. General Background

In the offshore drilling and production industry, a pipe is often used to carry product (oil or natural gas) from the offshore production site to a collection and storage facility, which may be a tanker or an on shore facility. For offshore structures that rest on the sea floor, such as a jacket or compliant tower, the flexing effect of environmental conditions such as waves and currents have a minimal effect on the design considerations when connecting the pipe to the offshore structure. However, for floating offshore structures, the design of the interface between the pipe and offshore structure must take into account the bending motions, and resulting fatigue and stresses, that the pipe and interface must endure during the life of the structure. The steel catenary pipeline riser approach is generally considered as the most cost effective means for transporting products to and from floating offshore production vessels.

For a floating structure such as a TLP (tension leg platform) or a semi-submersible, the typical configuration of this riser is for the pipe to be suspended from the side of the floating vessel from a support platform that is located just below the water surface (fifty to one hundred feet). Typically, the pipe leaves the support platform at an angle from the vertical of between five and twenty-five degrees and curves upward along its length until the pipe becomes tangent with the sea floor some distance away from the floating vessel. Once the steel catenary pipe is installed with its upper end resting on the support platform, the pipe is connected to other piping previously installed on the floating vessel. This connection is typically made with the aid of divers which can be accomplished quite easily, since the support platform is near the water surface.

There are several disadvantages with this support structure for the steel catenary riser when used with a floating vessel such as a spar, which may have a draft as deep as six hundred fifty feet. Typically, the mooring lines for the spar are attached to fairleads located several hundred feet below the water surface. Thus, the steel catenary risers, if supported nearer the water surface, would be required to be installed between the mooring lines. In addition, when the risers are supported near the water surface, the upper portion of the riser is subjected to large wave and current loads which can produce over stressing and cause undesirable fatigue damage.

These two disadvantages can be overcome with a spar floating vessel by supporting the end riser much deeper in the water near the keel of the spar. However, if this approach is employed, the use of divers to connect the riser pipe to the piping previously installed on the spar would be very difficult and costly. One solution, proposed in patent application assigned Ser. No. 08/701,622 and filed Aug. 22, 1996, employs a flexible pipe-in-pipe support system wherein the steel catenary riser pipe is pulled up through an outer flexible support pipe. This arrangement works well with an open type of floating structure such as that described in U.S. Pat. No. 5,558,467, but becomes more difficult with a closed floating structure such as that described in U.S. Pat. No. 4,702,321. With a flexible pipe-in-pipe support arrangement, the outer pipe at the last support point on the floating structure is contained within a guide that permits angular motions of the support pipe and riser pipe. It would be virtually impossible to seal this last support pipe against water to maintain the buoyancy required to install the closed floating structure.

SUMMARY OF THE INVENTION

The invention addresses the above need. What is provided is a catenary riser support, for a floating offshore structure, that receives the catenary riser and is attached to the floating offshore structure. The catenary riser support is formed from a tube that is rigidly attached to the floating structure and a flex joint in line with the catenary riser. The tube includes a gradual bend that complements the natural catenary curve of the catenary riser. A pipe adaptor attached in line with the flex joint and riser allow the flex joint to be pulled up against the tube. The flex joint allows the catenary riser to move relative to the floating structure and thus minimizes bending stresses and potential fatigue damage in the upper portion of the riser.

BRIEF DESCRIPTION OF THE DRAWINGS

For a further understanding of the nature and objects of the present invention reference should be made to the following description, taken in conjunction with the accompanying drawings in which like parts are given like reference numerals, and wherein.

DETAILED DESCRIPTION OF THE PREFERRED EMBODIMENT

Figure 1:
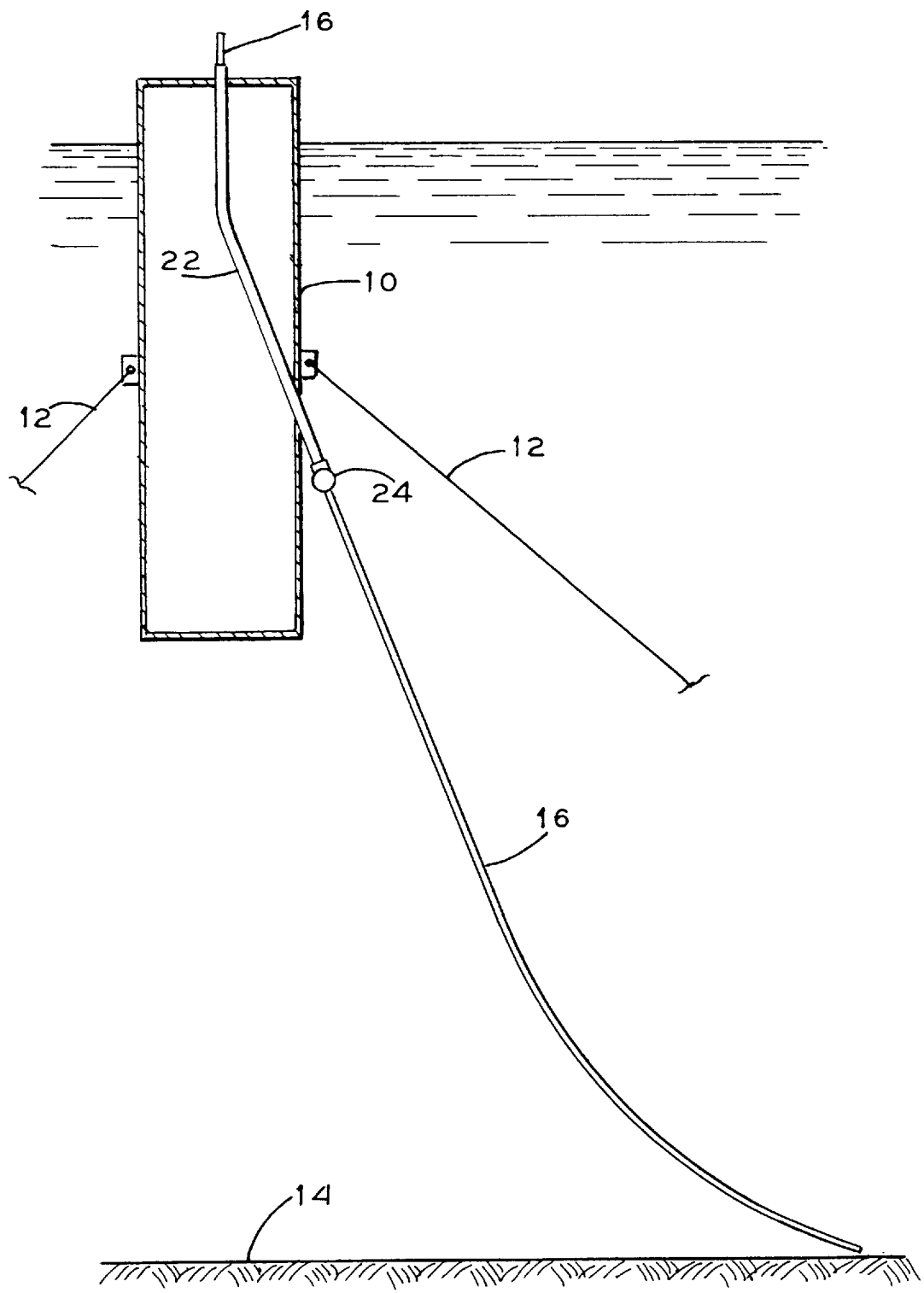
FIG. 1 is a side view that illustrates the invention on a floating offshore structure.

In FIG. 1, a floating offshore structure 10 is held in position by a plurality of mooring lines 12. The mooring lines 12 are attached at one end to the floating structure 10 and at the opposite end to anchors or pilings not shown in the sea floor 14. Catenary riser 16 extends from the sea floor 14 up to the floating structure 10 and is received in and supported by the invention, generally indicated by numeral 20.

Figure 2:
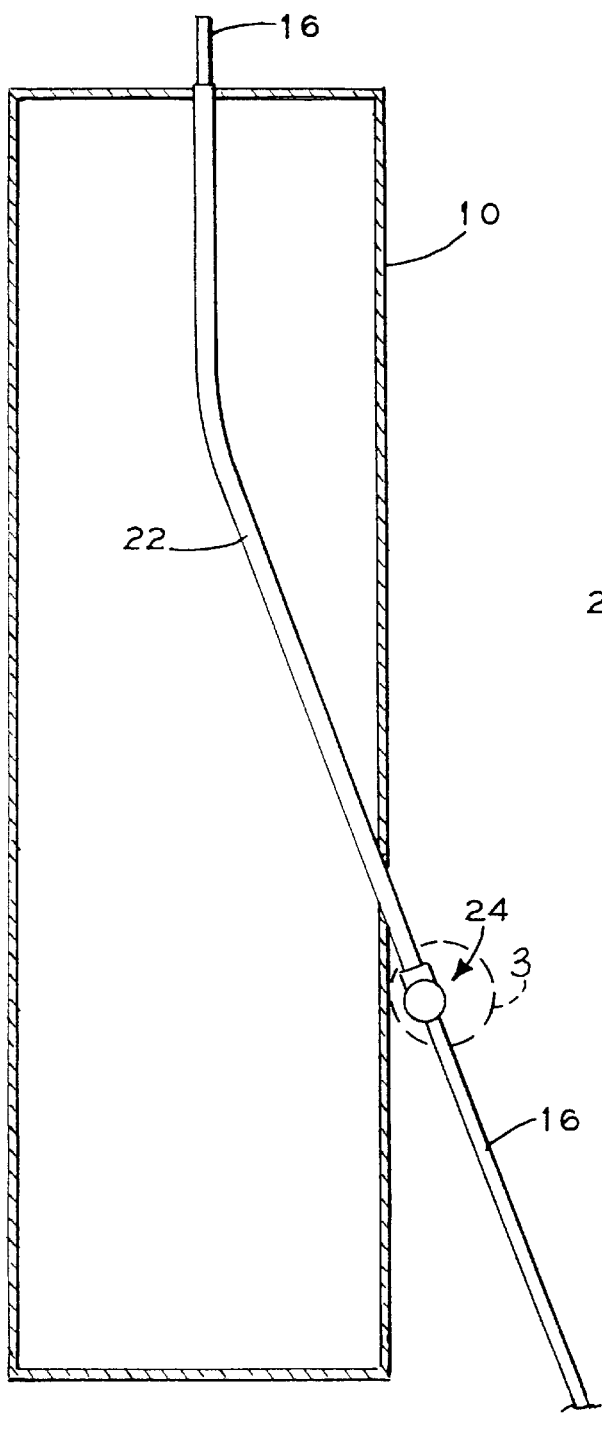
FIG. 2 is an enlarged schematic illustration of the invention.

As best seen in FIG. 2, catenary riser support 20 is generally comprised of a tube 22 and a flex joint 24.

Tube 22 is bent at a preselected angle complementary to the natural curve of the catenary riser 16. In the industry, such a bend is commonly referred to as a J-bend. Therefore, for the sake of easy reference tube 22 may also be referred to as a J-tube. Tube 22 is provided with an internal diameter sized to receive the catenary riser 16. Tube 22 is also sized in length and attached to the floating offshore structure 10 at a preselected depth such that the upper end of tube 22 extends to the upper end of the floating structure 10 and the lower end of the tube 22 extends to the side of the floating structure 10 at a preselected angle that is complementary to the natural catenary curve of the catenary riser 16. Tube 22 is rigidly attached to the floating structure 10 and is designed to be non-flexing such that flexing is accommodated by flex joint 24. Tube 22 may penetrate the offshore structure 10 such that the upper end of the tube 22 exits the upper end of floating structure 10 at any preselected location on the upper end of floating structure 10. In this arrangement, it is necessary that the penetration point of the lower end of tube 22 be sealed to prevent the entry of water into floating structure 10, which would adversely affect the ballast situation.

Figure 3:
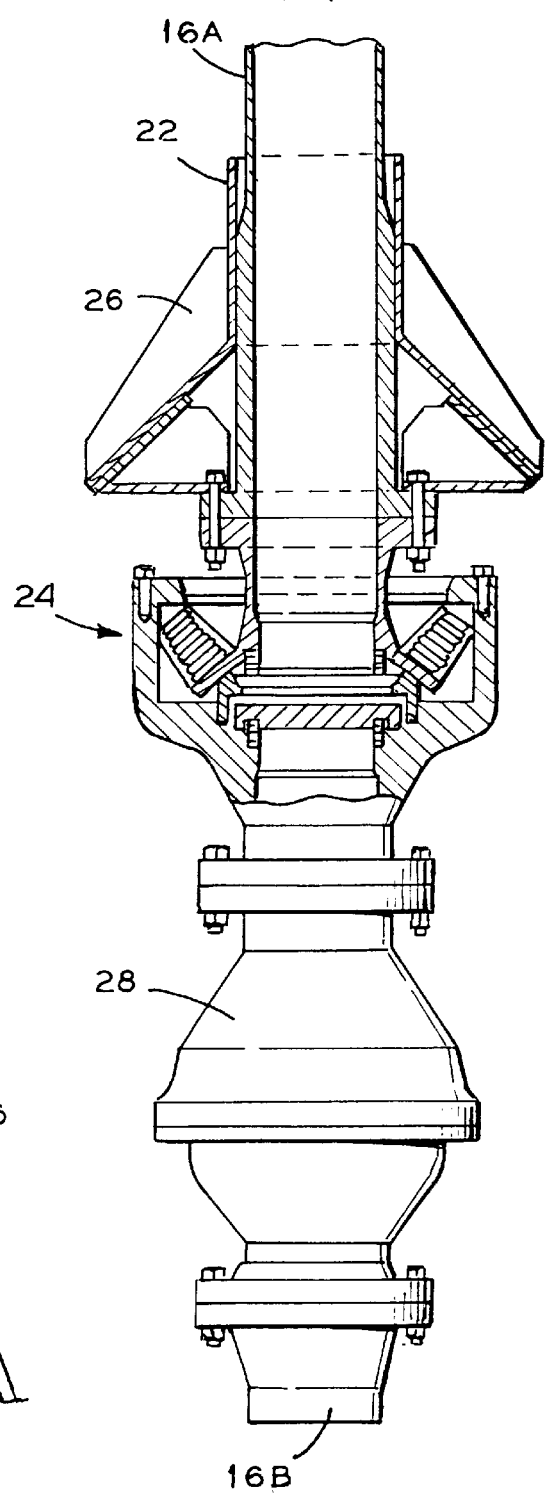
FIG. 3 is an enlarged view of the circled area in FIG. 2.

As seen in FIG. 2 and 3, flex joint 24 is positioned at the lower end of tube 22. Flex joint 24 is received in line in catenary riser 16 such that the product flows through the flex joint 24. Pipe adaptor 26 is attached to the lower end of the upper section 16A of catenary riser 16 and flex joint 24. The upper end of the lower section 16B of catenary riser 16 is attached to the lower end of the flex joint 24. FIG. 3 also illustrates an optional ball valve 28 received in line between the lower section 16B of catenary riser 16 and the flex joint 24. Ball valve 28 is used to selectively control product flow through catenary riser 16.

In operation, flex joint 24 and ball valve 28 are added in line to catenary riser 16 as it is laid on the sea floor 14, when the length of catenary riser 16 is appropriate for raising it up to the floating structure 10. Pipe adaptor 28 and the upper section 16A of catenary riser 16 are then attached in line with the flex joint 24 and the upper section 16A of catenary riser 16 is pulled up through tube 22 until catenary riser 16 extends above the upper end of tube 22 and the pipe adaptor is pulled against the lower end of tube 22. Flex joint 24 allows the catenary riser 16 to move relative to the floating structure and thus minimizes bending stresses and potential damage in the upper section 16A of the catenary riser 16. Flex joints are generally well known in the industry and flex joint 24 should only be considered as an example of a suitable flex joint that may be used as part of the invention.

An advantage of the invention is that it allows the catenary riser 16 to be supported at a depth on the floating structure where the induced stresses in the entire riser are reduced. Thus, the potential for fatigue damage is minimized. Another advantage is that the gradual bending of the tube 22 permits the passage of internal pipe cleaning "pig" elements. Also, the upper end of the riser pipe is above the water in the platform and provides access for inserting flow maintenance items into the pipeline such as pipe cleaning "pigs" and coiled tubing. The invention also allows the riser to be brought up through the center of a closed floating structure without the danger of flooding the structure as referred to for other catenary riser supports. Directing the riser through the center of the floating structure also minimizes the external modifications required to receive a side mounted riser support.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a floating offshore structure for producing hydrocarbons where a catenary riser extends from a sea floor to the floating structure, a support for the catenary riser, said support comprising:

a. a tube rigidly attached to the floating offshore structure at a preselected depth, said tube having upper and lower ends and being bent at a preselected angle complementary to a natural curve of the catenary riser and sized to receive the catenary riser; and b. a flex joint received in the catenary riser and positioned at the lower end of said tube.

2. The catenary riser support of claim 1, wherein said tube is designed to be non-flexing.

3. The catenary riser support of claim 1, wherein said tube penetrates the interior of the floating structure.

4. In a floating offshore structure having interior spaces and used for producing hydrocarbons where a catenary riser extends from a sea floor to the floating structure, a support for the catenary riser, said support comprising:

a. a non-flexing tube rigidly attached to and penetrating the interior of the floating offshore structure at a preselected depth and extending upward in the floating structure so as to exit at a preselected position, said tube having upper and lower ends and being bent at a preselected angle complementary to a natural curve of the catenary riser and sized to receive the catenary riser; and b. a flex joint received in the catenary riser and positioned at the lower end of said tube.

\* \* \* \* \*